United States Patent Office 3,558,709
Patented Jan. 26, 1971

3,558,709
PROCESS FOR THE PREPARATION OF AMINES OR DIAMINES BY THE CATALYTIC HYDROGENATION OF NITRILES AND DINITRILES
Günter Höckele, Marl, Germany, assignor to Chemische Werke Huels A.G., Marl, Germany
No Drawing. Filed Apr. 19, 1968, Ser. No. 722,576
Int. Cl. C07c 85/12
U.S. Cl. 260—583         8 Claims

ABSTRACT OF THE DISCLOSURE

In a process for the preparation of an amine by the catalytic hydrogenation of a nitrile, the improvement comprising employing as the catalyst a composite catalyst consisting essentially of a support of a large-pore α-aluminum oxide having a crystalline proportion of α-aluminum oxide of more than 70% by weight, a specific surface of between 0.5 and 30 m.$^2$/g., and a water absorption of between 30 and 60 cm.$^3$/100 g.; and coated on said support cobalt in a proportion of about 5–35% of the total catalyst.

BACKGROUND OF THE INVENTION

This invention relates to a process for the preparation of amines or diamines by the catalytic hydrogenation of nitriles and dinitriles, and in particular to a novel catalyst support therefor.

For the catalytic hydrogenation of nitriles and dinitriles in the presence of ammonia, it is preferred to employ solid-bed catalysts obtained by precipitating on porous supports thermally decomposable cobalt salts in admixture with other metallic salts such as those of chromium and manganese, which decompose under heating into difficulty reducible oxides. As supports for these catalysts, there have been suggested silica gel, silica acid, aluminum silicates, pumice, and also aluminum oxides (German Pat. 964,864). With the use of such cobalt-containing supported catalysts, the hydrogenation is usually conducted by diluting the nitriles and dinitriles to be hydrogenated with inert solvents in order to remove the heat of reaction and to avoid local overheating, the reaction taking place at about 100° C. under a pressure if 150–300 atmospheres in the presence of ammonia and hydrogen.

During the hydrogenation, such hereinbefore described conventional catalysts exhibit an unacceptably short catalyst life, particularly when employed without suitable diluents. Even after a short reaction period, the catalyst, which originally was very stable mechanically, is chemically destroyed on the side where the product enters. Moreover, the previously employed support substances partially decompose into a powder when being treated with a dinitrile-diamine mixture under the conditions of the hydrogenation reaction, thereby clogging the bed which, in turn, causes numerous problems.

SUMMARY OF THE INVENTION

It is thus an object of this invention to reduce, if not eliminate, the premature clogging of the catalyst bed due to the decomposition of the support.

Another object is to provide a novel catalyst support and/or novel composite coated catalyst.

Upon further study of the specification and claims, other objects and advantages of the present invention will become apparent.

To attain the objects of this invention wherein the preparation of amines or diamines is obtained by the catalytic hydrogenation of the corresponding nitriles or dinitriles in the presence of cobalt catalysts precipitated on supports, a novel support is provided. This support is a large-pore α-aluminum oxide having a crystalline proportion of α-aluminum oxide of more than 70% by weight, a specific surface of between 0.5 and 30 m.$^2$/g., and a water absorption of between 30 and 60 cm.$^3$/100 g.

Advantageously, an α-aluminum oxide support having a crystalline α-proportion of more than 75% by weight is employed. More preferably there is used an α-aluminum oxide having a crystalline proportion of 90 to 100%.

The water absorption ranges advantageously between 40 and 60 cm.$^3$/100 g. of support material. This water absorption is a measure of the pore volume and is determined in accordance with the following method:

The measured sample of the support material is evacuated by subjecting it to a water aspirator, and a measured amount of water is poured thereover. The nonabsorbed water is measured after it has been allowed to run off, and the difference is calculated.

Suitably, after the support has been covered with water, the aspirator can once again be applied for a very short period of time for control purposes to see whether any additional gas bubbles appear. Of course, no water losses must be incurred thereby.

The specific surface ranges advantageously between 3 and 30 m.$^2$/g. of support material. The specific surface is determined in accordance with the method described by S. Brunauer, P. H. Emmitt, and E. Teller in "Journal of the American Chemical Society" 60, page 309, (1938).

The large-pore aluminum oxide of the α-modification employed according to the present invention is obtained by annealing aluminum oxides of the γ- or η-modification during calcining above 1,000° C. In the preparation of the support material, the prerequisite is that sintering on the particle surface has been avoided.

A more complete description of preparing the support is given in Cotton/Wilkinson, Anorganische Chemie, Weinheim 1967, page 410; Hollemann/Wiberg, Lehrbuch der anorg. Chemie, Berlin 1958, page 386; Matthes/Wehner, Anorganisch-technische Verfahren, Leipzig 1964, page 861; and B. N. Dolgow, Die Katalyse in der organ. Chemie, Berlin 1963, page 146.

The range of specific surface is not descriptive of the particle size range. The particle size ranges between 3 and 6 mm.

The proportion of the activating metal with respect to the total catalyst is generally 5–35, preferably 8–20% by weight of cobalt.

In addition to cobalt, other activating metals can be optionally present individually or in a mixture. The additional metals are present in the finished catalyst as oxides or mixed oxides. Suitable additional metals include, for example, chromium, manganese, nickel and silver, with manganese and silver being preferred. The additional metals are generally employed in amounts of 0.05–12, particularly 0.2–6% by weight, based on the total catalyst. When it is stated hereinafter that the composite catalyst "consists essentially" of the support and cobalt, these additional metals are meant to be optionally included. Furthermore, this term also covers products which additionally contain unspecified ingredients which do not effect the basic and novel characteristics of the invention.

The catalyst is produced by: (a) impregnating the support with an aqueous solution of the nitrates of cobalt and, for example, manganese and silver; (b) evaporation of the water; and (c) decomposition of the nitrates to the corresponding oxides. For activation, the catalyst is treated with hydrogen. Details of these steps are found in the literature, for example, Houben-Weyl, Methoden der organ. Chemie, Band IV, page 145, Stuttgart 1955. A detailed description also is given in the comparative Example 1, column 3.

The hydrogenation of the nitriles or dinitriles is conducted at temperatures between 80 and 120° C., preferably between 85 and 100° C., suitably at elevated pressures. The pressure is dependent upon the nitrile or dinitrile employed, and generally ranges between 200 and 500 atmospheres, particularly between 250 and 350 atmospheres absolute.

Suitably, the process is conducted with the addition of ammonia. It is likewise possible to use concomitantly the customary indifferent diluents, such as toluene, methanol and others. The process can, of course, be conducted batchwise as well as continuously. For additional details, reference is invited to: Houben-Weyl, Methoden der organ. Chemie, Band IV, page 164 and page 312 and Band XI, 1 page 554 ff.; B. N. Dolgow, Die Katalyse in der organ. Chemie, Berlin 1963, page 344; F. Zymalkowski, Katalytische Hydrierungen, Stuttgart 1945, page 256.

The catalysts employed in accordance with this invention allow the plant to run considerably longer without shutdown. Furthermore, excellent yields and conversions are obtained.

The amines and diamines produced by this invention are useful for a wide variety of well known purposes. For example, as solvents, as described in Ind. Engn. Chem, 24, 57/62 [1932], antifoaming agents for printing pastes (U.S.A. Pat. 2,074,380; as antistatic agents for acetate fibres (French Pat. 689,984), as stabilising agents for silver halogenide-emulsions (German Pat. 600,843), as agents for the flotation of phosphate ores (U.S.A. Pats. 2,185,968, 2,222,728), as components of lubricant compositions (U.S.A. Pats. 2,012,918, 2,234,096), as emulsifiers in the polymerization process of acrylic acid (U.S.A. Pat. 2,372,108). Finally, the diamines as dodecamethylene diamine and hexamethylene diamine are intermediates for the production of polyamides.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

COMPARATIVE EXAMPLE I

Pumice having a grain size of 3-6 mm. is impregnated in a conventional manner with an aqueous solution of a mixture of cobalt nitrate, manganese nitrate, and silver nitrate, the weight ratio of the metals being approximately 4:1:0.06. The catalyst is dried; calcined at 300–350° C. in an air current and, finally, reduced at 200–350° C. in a hydrogen stream. When this catalyst is charged into a high pressure tubular reactor with a mixture of adipodinitrile, ammonia, and hydrogen in a molar ratio of dinitrile:ammonia:hydrogen of 1:1:150, a 99% conversion with a yield of 94% of the desired hexamethylenediamine is achieved at 94° C. The charge is 0.1 l. of dinitrile per liter of catalyst. However, after only 60 hours, there is a marked rise in the pressure loss in the reactor, which loss increases during the course of a further 12 days to such an extent that the reaction must be terminated. The catalyst had become fused together completely at the product entry point, in a layer of 3-5 cm. After the dissolution of the organic products, a strong decomposition of the catalyst support had occurred.

Example 1

A spherical $\alpha$-$Al_2O_3$ in a grain of 3-5 mm. with a crystalline $\alpha$-$Al_2O_3$ content of above 80%, with a water absorption of 55 cm.$^3$/100 g., having a specific surface of 8 m.$^2$/g. and a compressive strength of more than 10 kg., is impregnated, calcined and reduced under the same conditions as set forth in the comparative example. The catalyst contains, per unit volume, the same amount of cobalt, manganese and silver as the comparative catalyst. Under the reaction conditions of the comparative example, an identical mixture of adipodinitrile, ammonia, and hydrogen is hydrogenated. At 94° C., a 99% conversion is obtained with a yield of 93% of desired hexamethylenediamine. The originally measured pressure loss of 3 atmospheres, the conversion, and the yield remain completely constant even after 30 days of operating the plant. A destruction of the support is not observed.

COMPARATIVE EXAMPLE II

When charging the pumice catalyst described in Comparative Example I in a pressurized tubular reactor with a mixture of biscyanoethylene glycol ether, ammonia, methanol and hydrogen in a molar ratio of 1:3:5:150 (0.1 l. of dinitrile per liter of catalyst), a marked rise in the pressure loss in the reactor is meaurable only after a few hours at a hydrogenation temperature of 85° C. (a conversion of above 95%, and a yield of more than 70% of the desired bisaminopropyl glycol ether). After 130 hours, the pressure loss had increased to such an extent that the reaction had to be terminated. The catalyst was extensively decomposed.

Example 2

Under the reaction conditions of Comparative Example II, an identical mixture of biscyanoethylene glycol ether, ammonia and hydrogen is hydrogenated with the catalyst on the $\alpha$-$Al_2O_3$ of Example 1. After an operating period of 400 hours at a conversion of about 95% and a yield of more than 70% of the desired bisaminopropyl glycol ether, the pressure loss remains constant. No destruction of the support is observed.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be, within the full range of equivalence of the following claims.

In the following claims, the term "amine" covers mono and diamines, and the term "nitrile" covers mono and dinitriles. This invention covers a process for the production of all possible types of mono- and diamines, aliphatic, cycloaliphatic, aromatic, and heterocyclic mono- and diamines.

Advantageously, nitriles as adipodinitrile, biscyanoethylene glycol ether, decamethylene dinitrile, methoxy propionitrile, and acrylonitrile can be hydrogenated to the corresponding amines.

What is claimed is:

1. In a process for the preparation of an amine by the catalytic hydrogenation of an aliphatic nitrile, the improvement comprising employing as the catalyst a composite catalyst consisting essentially of a support of a larger-pore $\alpha$-aluminum oxide having a crystalline proportion of $\alpha$-aluminum oxide of more than 70% by weight, a specific surface of between 0.5 and 30 m.$^2$/g., and a water absorption of between 30 and 60 cm.$^3$/100 g.; and coated on said support cobalt in a proportion of about 5–35% of the total catalyst.

2. A process as defined by claim 1 wherein the crystalline portion of the $\alpha$-aluminum oxide is more than 75%.

3. A process as defined by claim 1 wherein the specific surface is 3–30 m.$^2$/g.

4. A process as defined by claim 2 wherein the specific surface is 3–30 m.$^2$/g.

5. A process as defined by claim 1 wherein the water absorption is 40–60 cm.$^3$/100 g.

6. A process as defined by claim 2 wherein the water absorption is 40–60 cm.³/100 g.

7. A catalyst as defined by claim 3 wherein the water absorption is 40–60 cm.³/100 g.

8. A process as defined by claim 4 wherein the water absorption is 40–60 cm.³/100 g.

References Cited

UNITED STATES PATENTS 3,232,888  1/1966  Adam _____ 252—435
3,418,375  12/1968  Schmitt et al. ____ 260—583(K)
3,427,356  2/1969  Baer et al. _____ 260—583(K)

CHARLES B. PARKER, Primary Examiner

R. L. RAYMOND, Assistant Examiner

U.S. Cl. X.R.

252—466; 260—563, 578, 584